US008600038B2

(12) United States Patent
Mohammad et al.

(10) Patent No.: US 8,600,038 B2
(45) Date of Patent: Dec. 3, 2013

(54) SYSTEM AND METHOD FOR ECHO CANCELLATION

(75) Inventors: Asif Iqbal Mohammad, San Diego, CA (US); Steven L. Grant, Rolla, MO (US); Heejong Yoo, San Diego, CA (US); Deepak Kumar Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1277 days.

(21) Appl. No.: 12/204,608

(22) Filed: Sep. 4, 2008

(65) Prior Publication Data

US 2010/0057454 A1 Mar. 4, 2010

(51) Int. Cl.
*H04M 9/08* (2006.01)
*A61F 2/20* (2006.01)
*H04B 3/20* (2006.01)
*H04B 1/38* (2006.01)

(52) U.S. Cl.
USPC .............. 379/406.09; 381/71.12; 370/290; 455/570

(58) Field of Classification Search
None
See application file for complete search history.

(56) References Cited

U.S. PATENT DOCUMENTS

| | | | |
|---|---|---|---|
| 4,901,307 A | 2/1990 | Gilhousen et al. | |
| 5,103,459 A | 4/1992 | Gilhousen et al. | |
| 6,574,211 B2 | 6/2003 | Padovani et al. | |
| 6,658,107 B1 * | 12/2003 | Sorqvist et al. | 379/406.05 |
| 6,687,723 B1 * | 2/2004 | Ding | 708/322 |
| 6,792,106 B1 * | 9/2004 | Liu | 379/406.05 |
| 7,672,445 B1 | 3/2010 | Zhang et al. | |
| 2002/0041678 A1 * | 4/2002 | Basburg-Ertem et al. | 379/406.01 |
| 2004/0125973 A1 * | 7/2004 | Fang et al. | 381/318 |
| 2005/0286466 A1 * | 12/2005 | Tagg et al. | 370/329 |
| 2006/0009154 A1 * | 1/2006 | Tung | 455/41.2 |
| 2008/0175308 A1 * | 7/2008 | Fimoff et al. | 375/232 |

OTHER PUBLICATIONS

C. Paleologu et al., Double-Talk Robust VSS NLMS Algorithm, IEEE ICASSP 2008, Apr. 4, 2008, p. 245-248.*
L. Rey Vega et al., A New Robust Variable Step-Size NLMS Algorithm, IEEE Transactions on Signal Processing, May 2008, p. 1878-1893.*
"Acoustic-Echo Cancellation Software for Hands-Free Wireless Systems", Application Report of Texas Instruments, Digital Signal Processing Solutions, SPRA 162, Jul. 1997, pp. 3-7.*
Benesty, J., et al., "A New Class of Double-talk Detectors Based on Cross-correlation," IEEE Transactions on Speech and Audio Processing, vol. 8, No. 2, Mar. 2000, pp. 168-172.
Benesty, J., et al., "A nonparametric VSS NLMS algorithm," IEEE Signal Processing Letters, vol. 13, No. 10, Oct. 2006, pp. 581-584.

(Continued)

*Primary Examiner* — Fan Tsang
*Assistant Examiner* — Jeffrey Lytle
(74) *Attorney, Agent, or Firm* — Espartaco Diaz Hidalgo

(57) ABSTRACT

An echo canceller for improved recognition and removal of an echo from a communication device. The echo canceller can dynamically reduce echo using an improved energy estimator and an improved adaptive filter. The improved energy estimator can determine if conversation is in a single talk period or a double talk period based on the combined energy of both the near end background noise and speech. The improved adaptive filter can reduce echo by dynamically changing adaptation speed or step size. In double talk, the adaptive filter(s) can dynamically slow-down or stop adaptation. In single talk, the filter can dynamically increase the speed of adaptation to improve accuracy, or decrease adaptation speed for stability.

38 Claims, 10 Drawing Sheets

(56) References Cited

OTHER PUBLICATIONS

Paleologu C et al., "Double-Talk Robust VSS NLMS Algorithm", IEEE ICASSP 2008, Apr. 4, 2008, p. 245-248.

Vega L.R., et al., "A New Robust Variable Step-Size NLMS Algorithm", IEEE Transactions on Signal Processing, May 2008, vol. 56 (5), pp. 1878-1893.

* cited by examiner

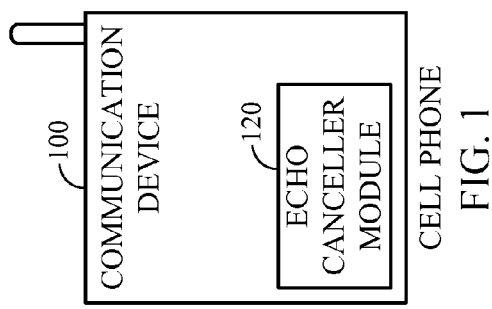
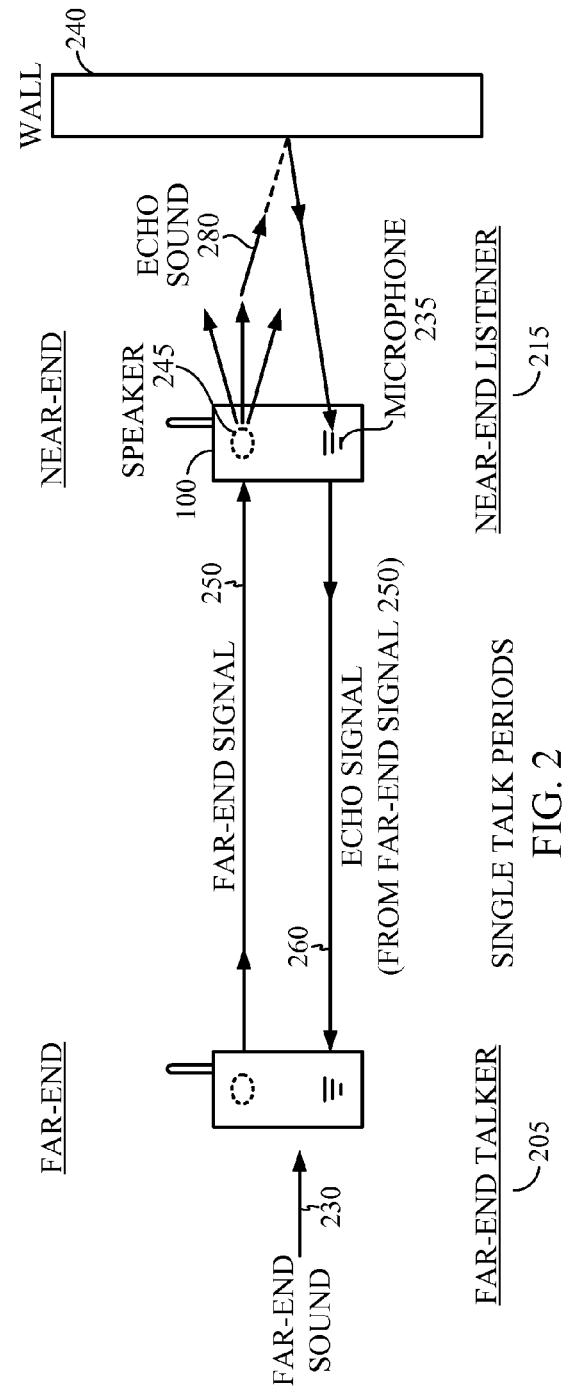

R1, R2 and R3 are Double Talk Detection Regions

ESTIMATE ENERGY

FILTER ECHO

SYSTEM AND METHOD FOR ECHO CANCELLATION

TECHNICAL FIELD

Embodiments of the invention relate to acoustic echo cancellation (AEC) in communication devices. In one embodiment, the invention relates to AEC in a cellular telephone.

BACKGROUND

Adaptive filter methods or algorithms are used extensively in many signal processing applications. For example, adaptive filtering is used for echo cancellation in communication devices.

An echo occurs when a party can hear his own voice or his own background noise through his communication device. In a telephone conversation, echo is heard when the party's sound signal travels through a speaker or speakerphone of the listener's telephone, and then travels back through the microphone of the listener's telephone. Echo is more prominent when one party is using his speakerphone.

Echo cancellation is a process of reducing or removing echo signals from communications, such as a conversation over a telephone. Echo cancellation first involves recognizing an echo signal. Then, once the echo signal is recognized, the echo can be removed by subtracting, filtering, or cancelling it.

More precisely, a linear adaptive filter in an echo canceller is typically used to model acoustic coupling between a speaker and a microphone. This acoustic coupling, or the path is often referred to as the true room response h[n]. The linear adaptive filter ĥ[n], which models the true room response is used to generate a replica of the echo, ŷ[n], which is subtracted from the echo corrupted microphone signal, m[n], to get an echo free signal e[n].

The process of echo cancellation only occurs when there is far end activity. In other words, echo cancellation is only performed at the listener's end when the speaker's end is active (e.g., the speaker is talking).

It is more difficult to remove an echo when both parties are talking simultaneously, also known as "double talk". This difficulty is referred to as the "double talk problem." On a near end microphone, there is near end speech, near end background noise, and a far end echo signal. The double talk problem is the difficulty in identifying and distinguishing the far end echo from the near end speech and near end background noise during double talk.

A conventional solution is to discretely, non-continuously, or non-dynamically halt the adaptation of a speech filter during double talk. This has been accomplished via a double talk detector. A double talk detector stops or halts the acoustic echo cancellation filter's adaptation during periods of simultaneous speech from both communication devices.

Conventional echo cancellers use a normalized least mean square (NLMS) based adaptive filter(s) to model the acoustic coupling between the loudspeaker and the microphone (i.e., model the true room response). This algorithm is very popular because of its robustness and simplicity. The stability and adaptation speed of this filter is governed by the step size parameter.

The larger the step size, the more rapidly the filter converges to the true room response but with a poor steady state misalignment or poor stability. On the other hand, a smaller step size gives lower steady state misalignment but at the cost of increased convergence time. Thus, the choice of step size parameter reflects a trade off between faster convergence on one hand and poor steady state misalignment on the other. A fixed step size based adaptive algorithm typically uses a small step size depending on the application, for steady state accuracy giving up the advantages of quicker convergence.

To address the above mentioned conflicting requirements, variable step size based adaptive algorithms have been used. A variable step size adaptive filter can use different step sizes at different instances of time. Recently, J. Benesty proposed a nonparametric variable step size (VSS) normalized least mean square (NLMS) based adaptive algorithm (J. Benesty, H. Rey, L. R. Vega, and S. Tressens, "A nonparametric VSS NLMS algorithm," IEEE Signal Processing Letters, Vol. 13, pp. 581-584, October 2006). However, Benesty's approach does not address the double talk problem. A key parameter in most VSS algorithms is the estimate of the energy of the near-end signal. Often minimum statistics based methods are used, but these only estimate the energy of the background noise of the near-end signal, not the energy of the total signal—the background and the near-end talker.

SUMMARY

One embodiment is a communication device comprising an input configured to receive a signal comprising near end background noise, near end speech signals, and far end echo signals, an estimator module configured to estimate an energy level of at least one of a level of the near end background noise and a level of the near end speech signals to determine whether the communication device is in a double talk period, and an adaptive filter configured to reduce the echo signals of the near end signal using a variable step size algorithm, wherein the variable step size algorithm dynamically changes a speed of the adaptive filter.

In another embodiment, there is a method of reducing echo signals during wireless communication, comprising receiving a voice signal comprising near end background noise, near end speech signals, and far end echo signals, estimating an energy level comprising both the near end background noise and the near end speech signals, determining whether said wireless communication is in a double talk period based on the estimated energy level, and reducing said echo signals using a variable step size adaptive filter.

In another embodiment, there is an echo cancellation module comprising an estimator module configured to estimate the energy of a near end sound signal, and an adaptive filter configured to determine when said sound signal is in a double talk period, and in response to said signal being in double talk reducing an echo in the near end sound signal, wherein the adaptive filter adjusts a variable step size based on the estimated energy.

In another embodiment, there is a wireless communication device, comprising means for receiving a voice signal comprising near end background noise, near end speech signals, and far end echo signals, means for estimating an energy level comprising both the near end background noise and the near end speech signals, means for determining whether said wireless communication is in a double talk period based on the estimated energy level, and means for reducing said echo signals using a variable step size adaptive filter.

In another embodiment, there is a computer storage, comprising instructions that when executed perform the method of receiving a voice signal comprising near end background noise, near end speech signals, and far end echo signals, estimating an energy level comprising both the near end background noise and the near end speech signals, determining whether said wireless communication is in a double talk period based on the estimated energy level, and reducing said echo signals using a variable step size adaptive filter.

BRIEF DESCRIPTION OF DRAWINGS

FIG. 1 is a block diagram illustrating an echo canceller module in a communication device.

FIG. 2 is a block diagram illustrating single talk periods.

DETAILED DESCRIPTION

Figure 3:
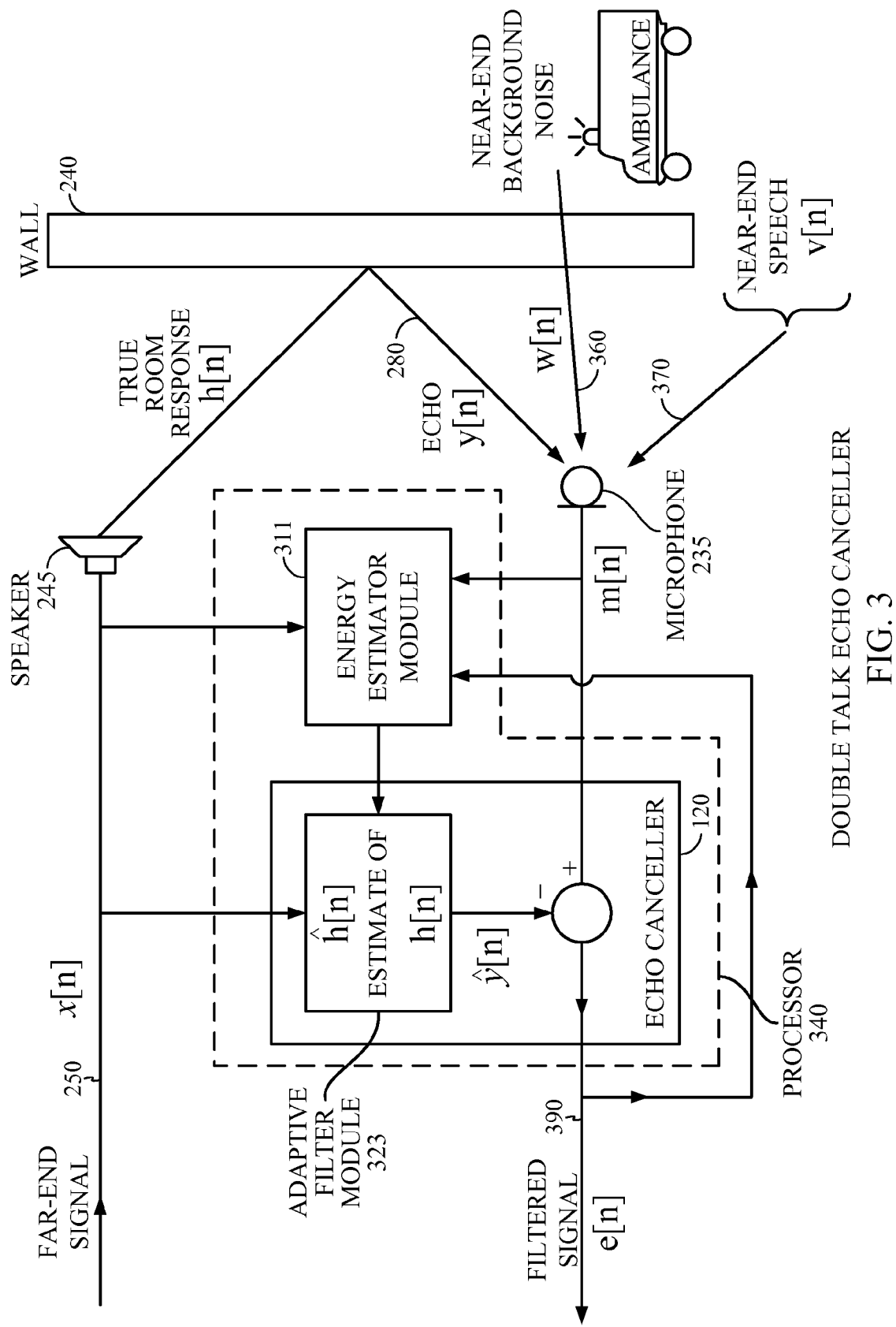
FIG. 3 is a block diagram illustrating double talk periods.

One embodiment is an echo cancellation module or circuit with an improved ability to recognize and remove an echo signal from a cellular telephone or other communication device. In one embodiment, the echo cancellation module or circuit dynamically reduces echo using an improved energy estimator and an improved adaptive filter.

In one embodiment the echo cancellation module is configured to determine whether there is an echo during a conversation between two parties. If there is an echo, the echo cancellation module is configured to determine whether single talk or double talk is taking place between the parties. A single talk period takes place when only one party is speaking. In contrast, a double talk period takes place as two parties are speaking simultaneously. In one embodiment, this determination is made based on the combined energy of both the near end background noise and speech, not just one of near end speech or background noise.

Based on this estimate, the estimator can determine whether only one party or both of the parties are talking at a given period of time. If both parties are talking simultaneously, that creates a difficulty of identifying one party's voice from the other party's echo (i.e., far end speech or background noise), making reducing the echo, (i.e., echo attenuation) more difficult. Alternatively, if only the far end party is talking at a given time, filtering is more straightforward, because a filter does not need to distinguish between the two party's voices. Further, when only a near end party is talking, near end filter adaptation does not occur, because there is no far end echo to cancel.

After determining what type of conversation is present, some embodiments include an adaptive filter that subtracts, reduces, or cancels the echo. This adaptive filter can dynamically and continuously change its characteristics or parameters to more accurately remove the echo. In one embodiment, the speed of filter adaptation is changed.

If the echo signal cannot be removed because it is masked by other signals, the adaptive filter can dynamically slow down adaptation until it is at a stage where the echo signal can be distinguished. In one embodiment, the adaptive filter slows or stops until the conversation resumes in single talk with only the far end party talking. If the system is in a single talk period because only the far end party is talking, then the speed of filter adaptation increases in order to improve accuracy. If the filter is already accurately separating out the echo signals, then the system can decrease the adaptation speed in order to improve the steady state performance.

This detailed description is directed to certain specific embodiments of the invention. However, the invention can be embodied in a multitude of different ways. In this description, reference is made to the drawings wherein like parts are designated with like numerals throughout. More particularly, it is contemplated that the embodiments may be implemented in or associated with a variety of electronic devices such as, but not limited to, mobile telephones, wireless devices, and personal data assistants (PDAs).

FIG. 1 illustrates an echo canceller module 120 in a communication device 100. Communications devices can include, among other devices, a hands free car phone system, landline houseline phone, conference calling phone, cell phone, installed room system which uses ceiling speakers and microphones on the table, mobile communication devices, bluetooth devices, and teleconferencing devices, etc. In one embodiment the communication device 100 runs on an AMPS, GSM, CDMA, or WCDMA type cellular network.

The general principles of CDMA communication systems, and in particular the general principles for generation of spread spectrum signals for transmission over a communication channel is described in U.S. Pat. No. 4,901,307 entitled "Spread Spectrum Multiple Access Communication System Using Satellite or Terrestrial Repeaters" and assigned to the assignee of the present invention. Moreover, U.S. Pat. No. 5,103,459 entitled "System and Method for Generating Signal Waveforms in a CDMA Cellular Telephone System" and assigned to the assignee of the present invention, discloses principles related to PN spreading, Walsh covering, and techniques to generate CDMA spread spectrum communication signals. Further, embodiments utilize time multiplexing of data and various principles related to "high data rate" communication systems, and the disclosed embodiments can be used in "high data rate" communication systems, such as that disclosed in U.S. patent application entitled "Method and Apparatus for High Rate Packet Data Transmission" Ser. No. 08/963,386 filed on Nov. 3, 1997, and assigned to the assignee of the present invention.

FIG. 2 illustrates single talk periods of a phone conversation between two parties speaking into communication devices. In a normal phone conversation, both parties politely take turns speaking or making noise, or at least the parties pause briefly between talking. The concept of one party talking at a time is known as a "single talk period." In a single talk period, the near end could be considered the listener's side, which is illustrated on the right side of this figure. In a single talk period, the talker could be on the far end, which is illustrated on the left side of this figure.

FIG. 2 shows far end sound 230 entering a communication device. Far end sound 230 can be speech from far end talker 205, or it could be background noise (not shown). Far end sound 230 is processed by a communication device, to produce far end signal 250. Far end signal 250 is sent to communication device 100, producing sound at speaker 245 for the near end listener 215 and echo sound 280 or signals that may directly or indirectly reach an input, such as microphone 235. The echo sound 280 may be sent back to the far end talker 205 as echo signal 260. One indirect way for echo sound 280 to travel between speaker 245 and microphone 235, is by bouncing off a wall 240. Echo is more prominent when a communication device is put on speakerphone, as it is easier for sound from far end signal 250 to directly or indirectly travel between speaker 245 and microphone 235.

FIG. 3 illustrates a phone conversation in double talk. In double talk, sounds are transmitted from both phones simultaneously. This simultaneous transmission of speech or background noise is known as double talk.

FIG. 3 shows far end signal 250 being received at speaker 245 of a communication device, echo canceller 120, and energy estimator module 311. A processor 340 is illustrated as surrounding the echo canceller module 120 and the energy estimator module 311 by dotted lines. These modules 120 and 311 can be located inside one or multiple processors (e.g., ARM processor, DSP processor, etc.). At speaker 245, echo y[n] 280 travels from speaker 245 to microphone 235. Echo 280 is the content of the signal itself, whereas h[n] is the path of the true room response, or a vector, which the adaptive filter is trying to model. FIG. 3 shows three voice signals, received at microphone 235. These signals include echo 280, near end speech signal 370, and near end background noise 360.

Thus, microphone 235 provides one means for receiving a voice signal comprising near end background noise, near end speech signals, and far end echo signals. The output of microphone 235, is signal m[n], which includes the three inputs signals: echo 280, background 360 and speech 370. The presence of more than just echo 280 at a given time, means double talk is occurring. One goal of echo cancelling, could be to extract speech 370 from the three signals at the output of microphone 235. Another goal, could be to extract speech 370 and background noise 360 from the three signals at the output of microphone 235. As discussed above, double talk echo is more difficult to remove, because of the difficulty of identifying one party's voice from the other party's echo (e.g., voice). During double talk, it is difficult to cancel echo 280, while not attenuating background noise 360 or near end speech signal 370.

FIG. 3 illustrates transmission of the total signal from microphone 235 into echo canceller 120. Echo canceller 120 is coupled to a near end signal energy estimator (NESEE), illustrated as energy estimator module 311. Estimator module 311 estimates the energy level of background noise 360 and speech signal 370 to determine whether the device is in double talk. Thus, energy estimator module 311 provides one means for estimating an energy level comprising both the near end background noise and the near end speech signals. Also, energy estimator module 311 provides one means for determining whether said wireless communication is in double talk based on the estimated energy level. Prior art estimators do not appear to estimate energy based on both speech and background noise, providing a less accurate estimate.

Echo canceller 120 also includes an improved variable step size (VSS) normalized least mean squared (NLMS) based adaptive filter, illustrated as adaptive filter module 323. Estimator module 311 outputs a signal into filter module 323, where this signal is used to determine the ideal step size at that time. Filter module 323 contains estimate ĥ[n], which is an estimate of the true room response h[n]. The estimate from module 323 is subtracted from the echo-corrupted signal m[n] at the output of microphone 235 to produce a filtered signal e[n] 390. An ideal goal, is for the filtered signal 390 to be identical to, or close to, the near end speech signal v[n] 370. Thus, adaptive filter module 323 provides one means for reducing said echo signals using a variable step size adaptive filter.

The improved filter module 323 can be a variable step size (VSS) normalized least mean square (NLMS) based adaptive algorithm, that dynamically adjusts step size to resolve the double talk problem (i.e., slow or halt the filter during double talk to eliminate the echo). Prior art filters (J. Benesty, D. R. Morgan and J. H. Cho, "A new class of double talk detectors based on cross-correlation," IEEE transactions on speech and audio processing, vol 8, no 2, March 2000) do not appear to solve the double talk problem using a VSS-NLMS algorithm. Prior art filters use a separate double talk detection algorithm to stop the filter.

As a result of the improved filter, a separate double talk detection algorithm is no longer required. Removing the double talk detection algorithm is beneficial, because of the computational savings.

As discussed above, the improved filter can use a variable step size. The step size can range between zero and one. As discussed above, a fixed step size filter selects one number in the range, whereas a variable step size filter can select different numbers at different instances of time.

When double talk is introduced, then the improved filter can decrease the step size to slow or halt convergence, preventing divergence, until at least one party pauses, stops talking, or stops sending a signal. The filter can be slowed down by reducing the step size to a small number (e.g., approximately zero). This adaptation speed decrease prevents the estimate from diverging significantly during periods of double talk.

In the absence of double talk the filter adaptation can be increased to full speed by increasing the step size to a large number (e.g., approximately one). In this scenario, the adaptive filter speed is increased to converge quickly and accurately reduce echo. However, if the adaptive filter is already accurately reducing echo, then the filter speed can be decreased for stability.

Computations are now provided corresponding to FIG. 3 so those skilled in the art can better understand the improved estimator and improved adaptive filter.

FIG. 3 shows the far end signal 250, x[n], which can travel from the speaker 245, through the echo path h[n] to create the echo signal 280 y[n]. Computationally speaking:

$$y[n] = h^T[n]x[n] \tag{1}$$

where:

$$h[n] = [h_0[n]h_1[n] \ldots h_{L-1}[n]]^T,$$

$$x[n] = [x[n]x[n-1] \ldots x[n-l+1]]^T,$$

and l is the length of the adaptive filter. This echo signal is acoustically added to the near end speech signal v[n] to get the microphone signal (m[n]):

$$m[n] = y[n] + v[n] + w[n] \tag{2}$$

where w[n] is the additive background noise. We define the residual error signal at time n as e[n]:

$$e[n] = m[n] - \hat{h}^T[n-1]x[n] \tag{3}$$

The residual error signal is used to adapt the l taps of the adaptive filter ĥ[n] to generate an estimate of the echo, $$\hat{y}[n] = \hat{h}^T[n-1]x[n] \tag{4}$$

Now focusing on the computations for the improved estimator in FIG. 3, the cross correlation between the far end vector x[n] and the residual error signal e[n] is given by: $r_{ex}[n]=E[x[n]e[n]]=R_{xx}\Delta h[n-1]$ where $E[\cdot]$ denotes the mathematical expectation, $R_{xx}=E[xx^T]$ and $\Delta h[n-1]=h[n]-\hat{h}[n-1]$. The variance of the residual error signal e[n] is given by:

$$\sigma_e^2[n]=E[e^2[n]]=\Delta h^T[n-1]R_{xx}\Delta h[n-1]+\sigma_v^2[n]+\sigma_w^2[n] \quad (5)$$

where, $\sigma_v^2[n]$ is the variance of the near end signal, $\sigma_w^2[n]$ is the background noise power and it is assumed that the background noise and near end signal are independent of the far end excitation. The near end signal energy estimator (NE-SEE) can be represented as:

$$\gamma^2[n] = \sigma_e^2[n] - \frac{1}{\sigma_x^2[n]} r_{ex}^T[n] r_{ex}[n] \approx \sigma_v^2[n] + \sigma_w^2[n] \quad (6)$$

where, $\sigma_x^2[n]$ is the variance of the excitation signal vector. The values of $\sigma_e^2[n]$, $\sigma_x^2[n]$ and $r_{ex}[n]$ in equation (6) are exact and not available in practice. An easily computed estimate is given by:

$$\hat{\gamma}^2[n] = \hat{\sigma}_e^2[n] - \frac{1}{l\hat{\sigma}_x^2[n]} \hat{r}_{ex}^T[n] \hat{r}_{ex}[n] \quad (7)$$

Where, the estimates denoted by hat are obtained using the exponential recursive weighting algorithm:

$$\hat{r}_{ex}[n]=\lambda\hat{r}_{ex}[n-1]+(1-\lambda)x[n]e[n]$$
$$\hat{\sigma}_x^2[n]=\lambda\hat{\sigma}_x^2[n-1]+(1-\lambda)x^2[n]$$
$$\hat{\sigma}_e^2[n]=\lambda\hat{\sigma}_e^2[n-1]+(1-\lambda)e^2[n] \quad (8)$$

Equation (6)-(7), which calculates the estimate, are important in showing that this new estimator includes both background noise ($\sigma_w^2[n]$) and speech ($\sigma_v^2[n]$) signals.

Now focusing closer on the computations for the improved adaptive filter in FIG. 3, the least mean square (LMS) solution, which leads to a variant of the LMS, such as the normalized least mean square (NLMS), is given by:

$$\hat{h}_{LMS}[n]=\hat{h}_{LMS}[n-1]+\mu[n]x[n]e[n]$$
$$e[n]=m[n]-\hat{h}_{LMS}[n-1]x[n] \quad (9)$$

The a posteriori error is given by:

$$\epsilon[n]=m[n]-\hat{h}^T[n]x[n]=\{h-\hat{h}[n]\}^T x[n]+v[n]+w[n] \quad (10)$$

The classical normalized least mean square (NLMS) solution is derived from the least mean square (LMS) solution, by forcing the a posteriori error to zero. In the absence of unwanted signals, and by substituting equation (9) in (10) the a posteriori error is given by:

$$\varepsilon[n] = y[n] - \hat{h}_{LMS}^T[n]x[n] \quad (11)$$
$$= \{h[n] - \hat{h}_{LMS}[n]\}^T x[n]$$
$$= \{h[n] - \hat{h}_{LMS}[n-1] - \mu[n]x[n]e[n]\}^T x[n]$$
$$= e[n]\{1 - \mu[n]x^T[n]x[n]\}$$

By equating the a posteriori error in (11) to zero, we get the classical normalized least mean square (NLMS) solution, i.e., $$\mu[n] = \frac{\hat{\mu}}{x^T[n]x[n]}$$

where $\hat{\mu}\in[0,1]$ is a fixed step size, and the update equation is given by:

$$e[n] = m[n] - \hat{h}^T[n-1]x[n] \quad (12)$$
$$\hat{h}[n] = \hat{h}[n-1] + \frac{\hat{\mu}x[n]e[n]}{x^T[n]x[n]+\delta}$$

where δ is a small positive regularization parameter added to prevent division by zero. The above procedure makes sense in the absence of background noise w[n]. Finding a step size in the presence of background noise w[n] that cancels the a posteriori error will introduce noise in filter coefficients.

$$\epsilon[n]=\{h[n]-\hat{h}_{LMS}[n]\}^T x[n]+w[n]$$
$$\epsilon[n]\rightarrow 0 \Longrightarrow \{h[n]-\hat{h}_{LMS}[n]\}^T x[n]=-w[n] \quad (13)$$

To prevent this introduction of noise in filter coefficients, instead of making the a posteriori error zero to better suit the needs of an acoustic echo cancellation (AEC), some embodiments equate the a posteriori error variance to the variance of all the unwanted signals. i.e. $\sigma_\epsilon^2[n]\rightarrow\sigma_v^2[n]+\sigma_w^2[n]\approx\gamma^2[n]$. This will dynamically prevent the unwanted near end signals from corrupting the filter coefficients, from equation (11) we have:

$$\sigma_e^2[n]\{1-\mu[n]x^T[n]x[n]\}^2 = \gamma^2[n] \quad (14)$$
$$\Rightarrow \mu[n] = \frac{\mu_{NEW}[n]}{x^T[n]x[n]}$$
$$\mu_{NEW}[n] = 1 - \frac{\gamma[n]}{\sigma_e[n]}$$

Equation 14 defines the variable step size algorithm ($\mu_{NEW}$(n)). The new variable step size normalized least mean square (VSS-NLMS) update equations are given by:

$$e[n] = m[n] - \hat{h}^T[n-1]x[n] \quad (15)$$
$$\hat{h}[n] = \hat{h}[n-1] + \mu_{NEW}[n]\frac{x[n]e[n]}{x^T[n]x[n]+\delta}$$

where the new variable step size is given by:

$$\mu_{NEW}[n] = 1 - \frac{\hat{\gamma}[n]}{\sigma_e[n]} \quad (16)$$
$$\approx \frac{\sqrt{\Delta h^T[n-1]R_{xx}\Delta h[n-1]}}{\sqrt{\Delta h^T[n-1]R_{xx}\Delta h[n-1]+\sigma_v^2[n]+\sigma_w^2[n]}}$$

The values of γ and $\sigma_e$ in (16) are exact and not available in practice. As a result, the final step size is given by:

$$\hat{\mu}_{NEW}[n] = 1 - \frac{\hat{\gamma}[n]}{\hat{\sigma}_e[n]} \quad (17)$$

where the estimates denoted by a hat are obtained using equations (7) and (8).

Equation (16), gives a good theoretical interpretation of the variable step size. It can be observed from equation 16 that when double talk is introduced $\mu_{NEW}[n]$ becomes very small (e.g., approximately equal to zero) to slow down adaptation speed during periods of near end signal.

Another advantage of the proposed VSS algorithm over the fixed step size classical NLMS algorithm is in the amount of echo attenuation provided during the noisy environments. The amount of echo attenuation provided by the linear adaptive filter is called echo return loss enhancement (ERLE). The ERLE of the classical NLMS adaptive algorithm is bounded by the noise floor (i.e., the classical NLMS adaptive algorithm cannot suppress the echo buried under the noise level). In other words, if the signal to noise ratio (SNR) at the microphone is 30 dB, then the classical NLMS adaptive algorithm can only suppress the echo up to 30 dB (i.e., up to the noise level which is −30 dB relative to signal level). However, the VSS adaptive algorithm can go beyond the noise level and suppress the echo buried under the noise level. This phenomenon can be observed in FIG. 7, during the non-double talk periods the ERLE of the classical NLMS algorithm is bounded at 30 dB, whereas the VSS adaptive algorithm goes beyond the noise level, that is up to 40 dB and more.

Different echo path changes or variation can be created by moving the communication device closer or further away from wall 240. This variation in distance and angle produces echo path variations of echo 280.

During echo path variations (in the absence of double talk) $\mu_{NEW}[n]$ can become large (e.g., approximately equal to one), to track the variations. Further, as the adaptive filter $\hat{h}[n]$ converges to the true room response $h[n]$, the step size decreases to achieve minimum possible steady state misalignment. In the absence of double talk, step size can be increased to converge faster, or decrease for stability when the filter is already accurate.

Figure 4:
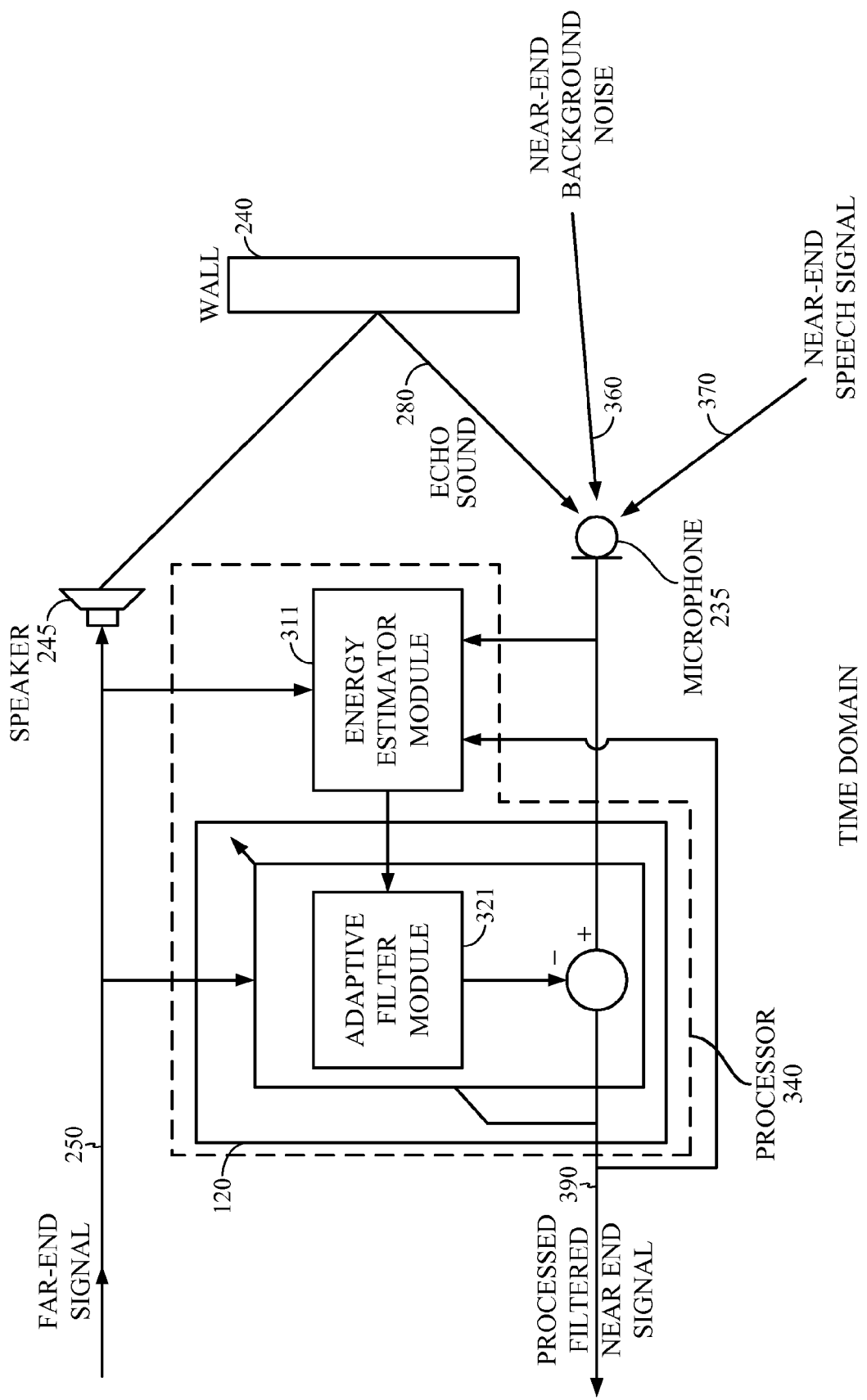
FIG. 4 is a block diagram schematically illustrating an echo canceller implemented in the time domain.
Figure 5:
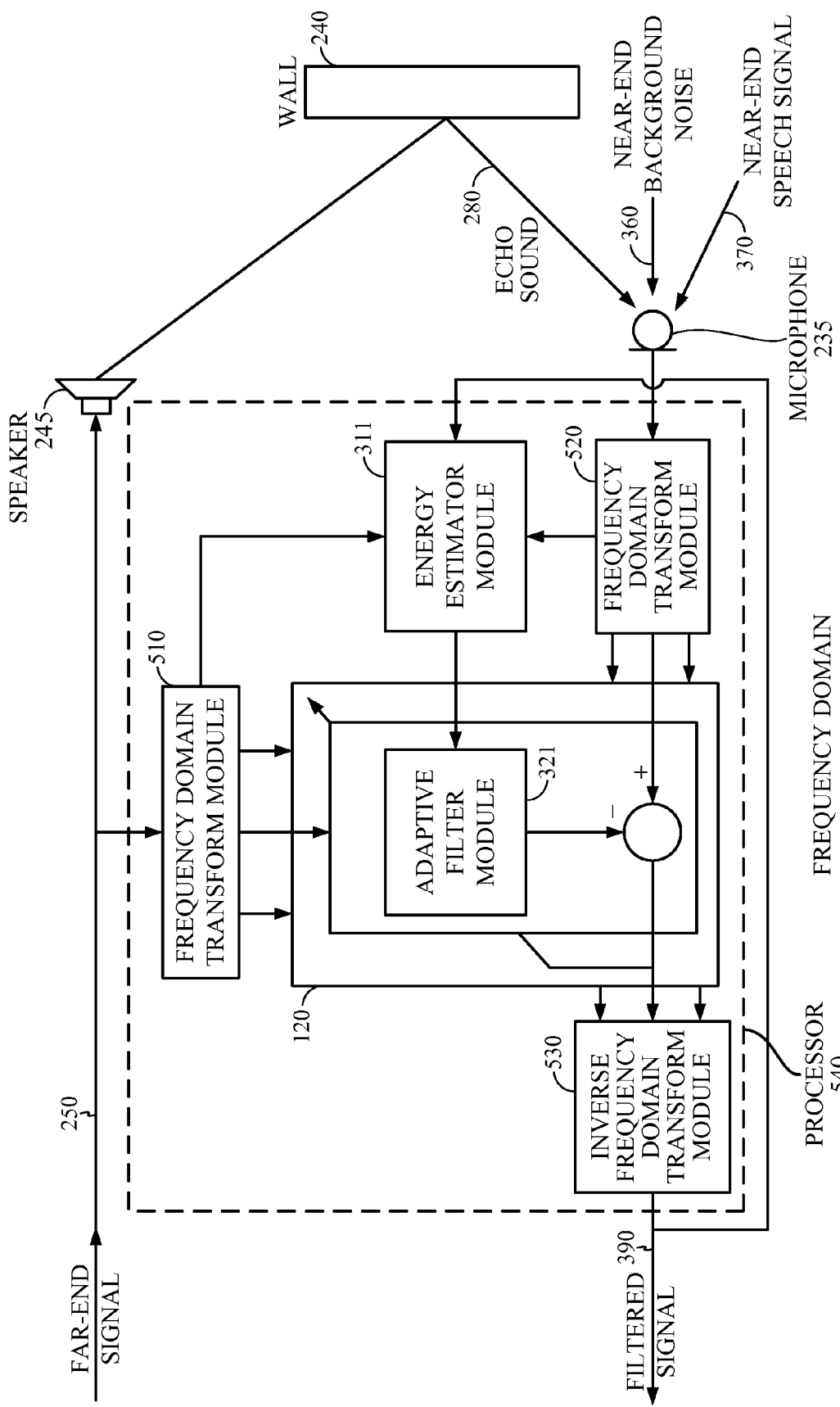
FIG. 5 is a block diagram schematically illustrating an echo canceller implemented in the frequency domain.

FIGS. 4-5 illustrate the double talk echo canceller of FIG. 3, illustrating the differences between operation in the time and frequency domain. FIG. 4 is a simplified version of FIG. 3.

FIG. 5, echo cancellation in the frequency domain, is similar to FIG. 4, but contains transform modules 510, 520, and 530. A processor 540 is illustrated as surrounding the echo canceller module 120, the energy estimator module 311, and the transform modules 510, 520, and 530, by dotted lines. These modules 120, 311, 510, 520, and 530 can be located inside one or multiple processors (e.g., ARM processor, DSP processor, etc.). FIG. 5 shows far end signal 250 entering frequency domain transform module 510 before being received by echo canceller 120. Transform module 510 converts far end signal 250 from the time to the frequency domain. A transform module is needed for an echo canceller 120 that operates in the frequency domain. The transform module 510 can be a Fast Fourier Transform (FFT). Similarly, the output of microphone 235 travels through frequency domain module 520 before entering echo canceller 120. Lastly, after the signal exits the echo canceller 120, an inverse frequency domain transform module 530 converts the frequency signal back to the time domain.

Figure 6:
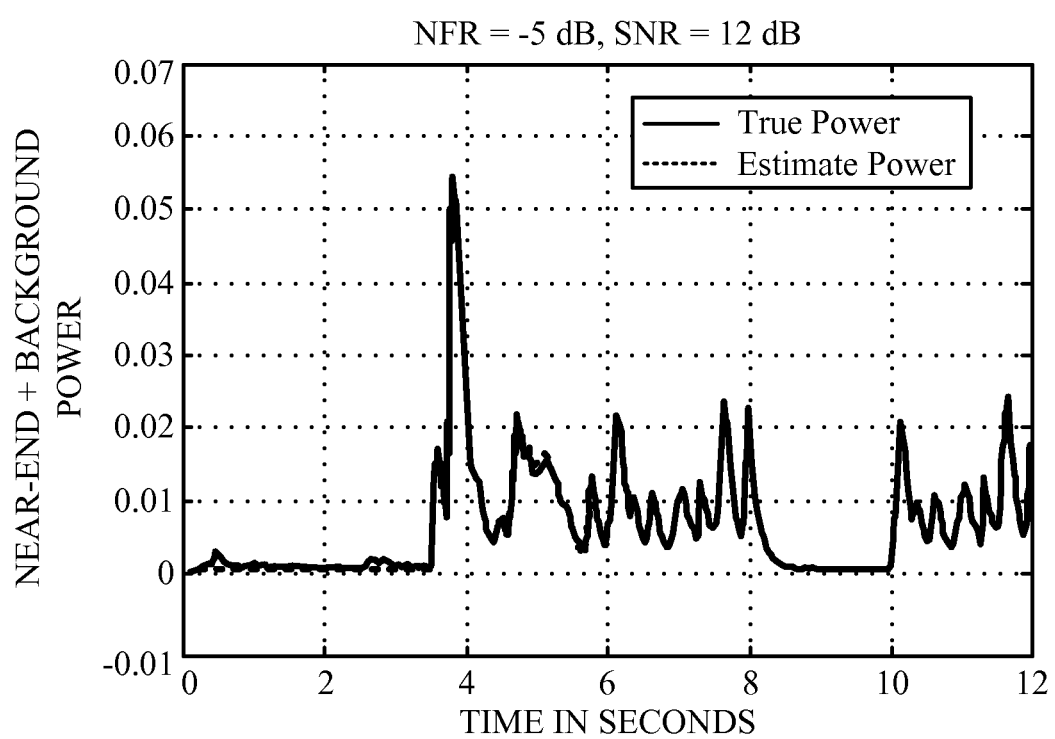
FIG. 6 is a line graph illustrating the efficiency of a near end signal energy estimator (NESEE).

FIG. 6 is a graph of a simulation illustrating the efficiency of the near end signal energy estimator NESEE) of some of the described embodiments. This simulation shows the estimated near end signal energy ($\gamma^2$) and the true/actual near end signal energy. This simulation demonstrates the accuracy of the improved near end signal energy estimator NESEE). A near end to far end ratio (NFR) of −5 dB and a signal to noise ratio (SNR) of 12 dB was used for these simulations. The estimator provides an energy estimate which is almost equivalent to the actual/true energy.

Figure 7:
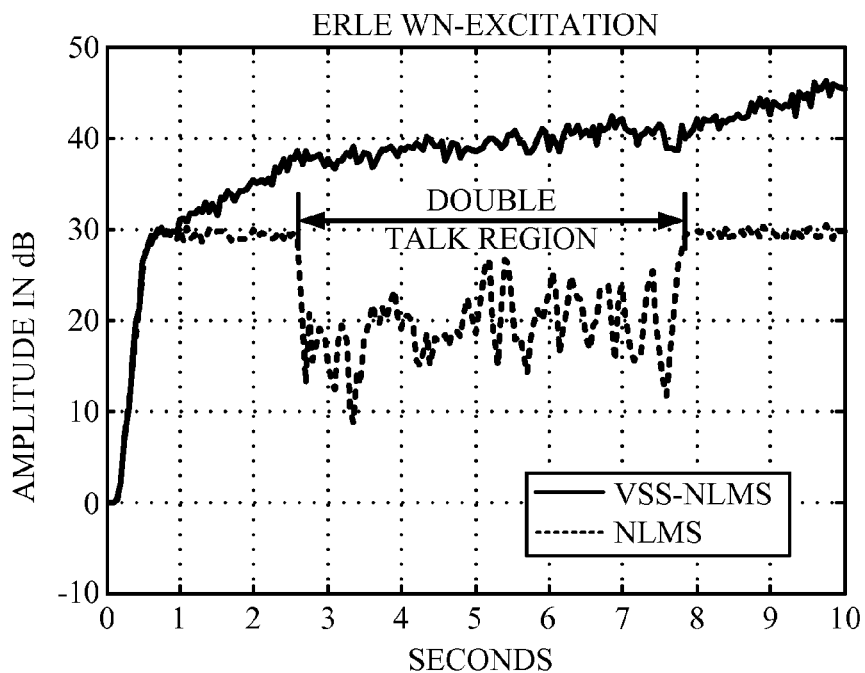
FIG. 7 is a line graph illustrating the improvement in echo return loss enhancement (ERLE) of the proposed method over classical normalized least mean squared (NLMS) with white noise excitation.
Figure 8:
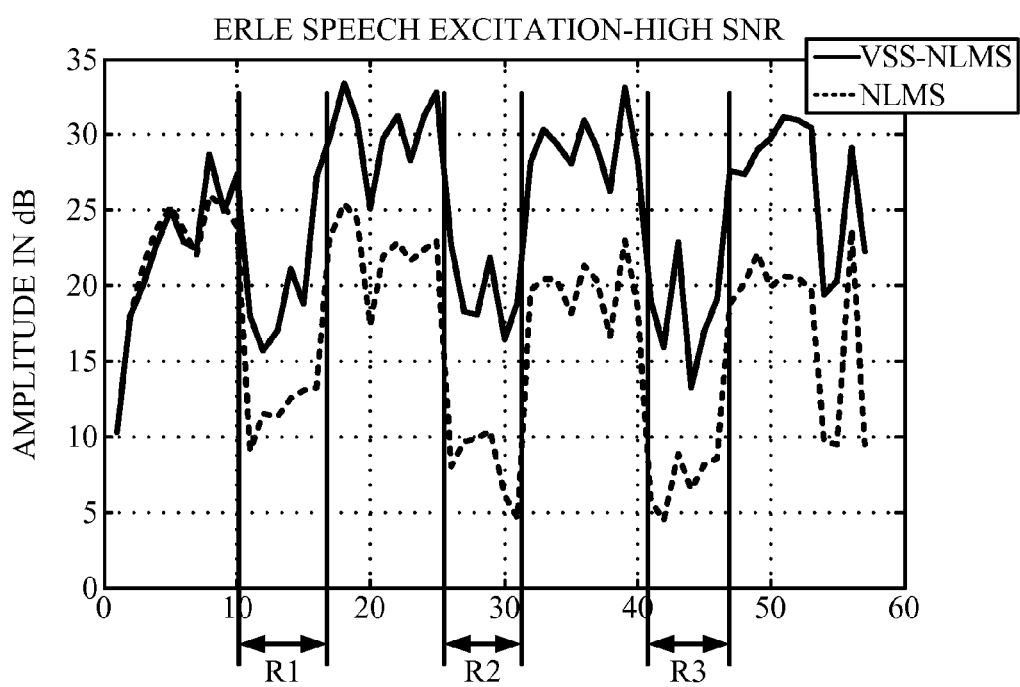
FIG. 8 is a line graph illustrating the improvement in echo return loss enhancement (ERLE) of the proposed method over classical normalized least mean squared (NLMS) with speech excitation.

FIGS. 7-8 illustrate simulations of some embodiments of this filter. FIGS. 7-8 display simulations in the context of acoustic echo cancellation that show that a variable step size (VSS) normalized least mean square (NLMS) algorithm has better convergence, at the same tracking rate, compared to the classical normalized least mean square (NLMS) adaptive algorithm, even at maximum step size.

FIG. 7 is a graph illustrating the improvement in echo return loss enhancement (ERLE) of the proposed method over classical normalized least mean squared (NLMS) based method with white noise excitation.

FIG. 8 is a graph illustrating the improvement in echo return loss enhancement (ERLE) of the proposed method over classical normalized least mean squared (NLMS) based method with speech excitation.

Figure 9:
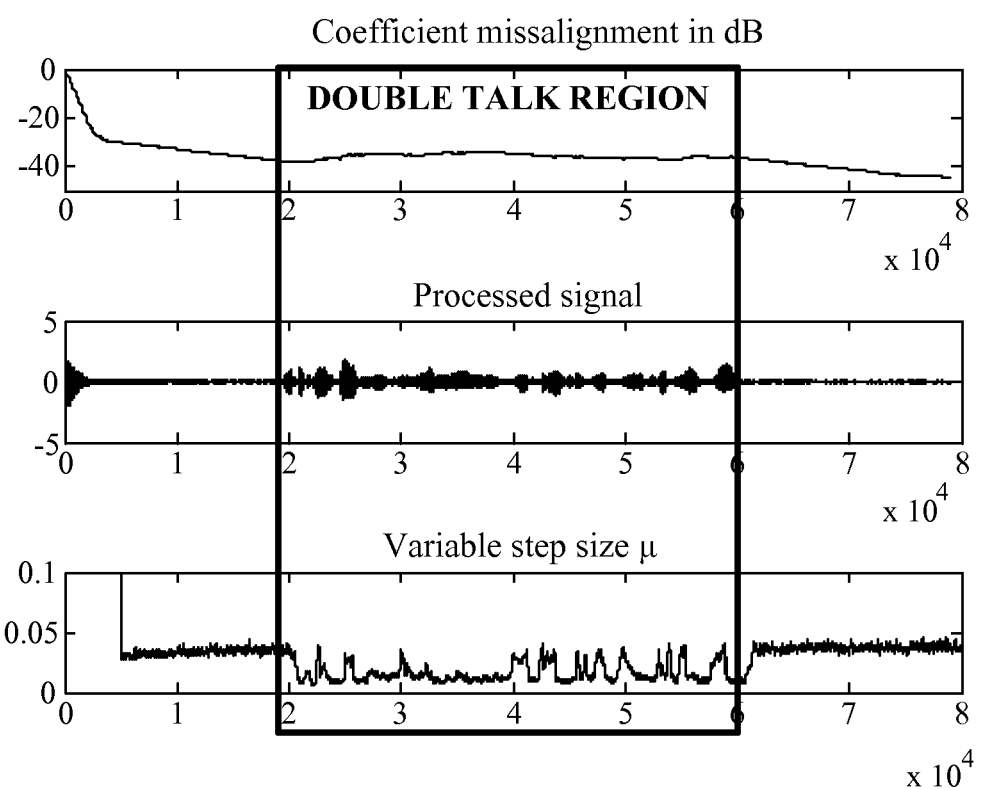
FIG. 9 is a plot illustrating the variations in the variable step size during single talk and double talk periods.

FIG. 9 is a graph illustrating the variations in the variable step size ($\mu_{NEW}(n)$) during single talk and double talk periods. It can be observed from FIG. 9 that during double talk periods the step size decreases beyond the steady state value to avoid divergence of filter coefficients.

Figure 10:
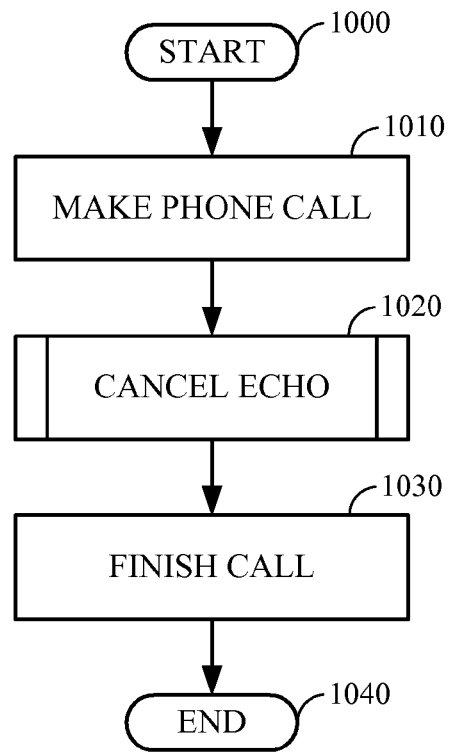
FIG. 10 is a flow diagram illustrating a high level process of echo cancellation in a phone conversation.

FIGS. 10-13 show a method of performing echo cancellation. FIG. 10 is a flow diagram illustrating a high level process of echo cancellation in a phone conversation. The process starts at step 1000. At step 1010, a party makes a phone call, or somehow initiates a conversation using a communication device. At step 1020, the process begins cancelling echo. At step 1030, the parties finish or terminate the phone call. The process ends at step 1040.

Figure 11:
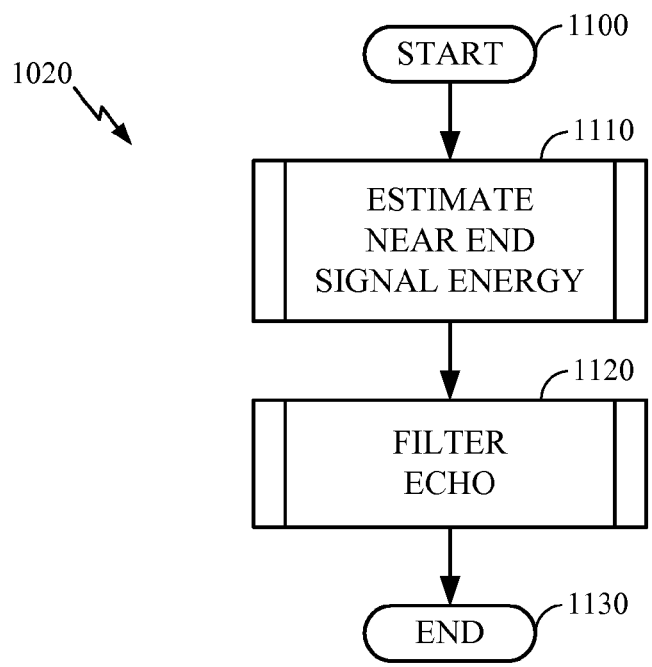
FIG. 11 is a flow diagram illustrating a high level process of cancelling echo by estimating energy and filtering echo.

FIG. 11 is a flow diagram illustrating a high level process of cancelling echo including estimating energy and filtering echo. The process starts at step 1100. At step 1110, the process estimates the near end signal energy. At step 1120, the process filters the echo using the knowledge of the estimated energy. The process ends at step 1130.

Figure 12:
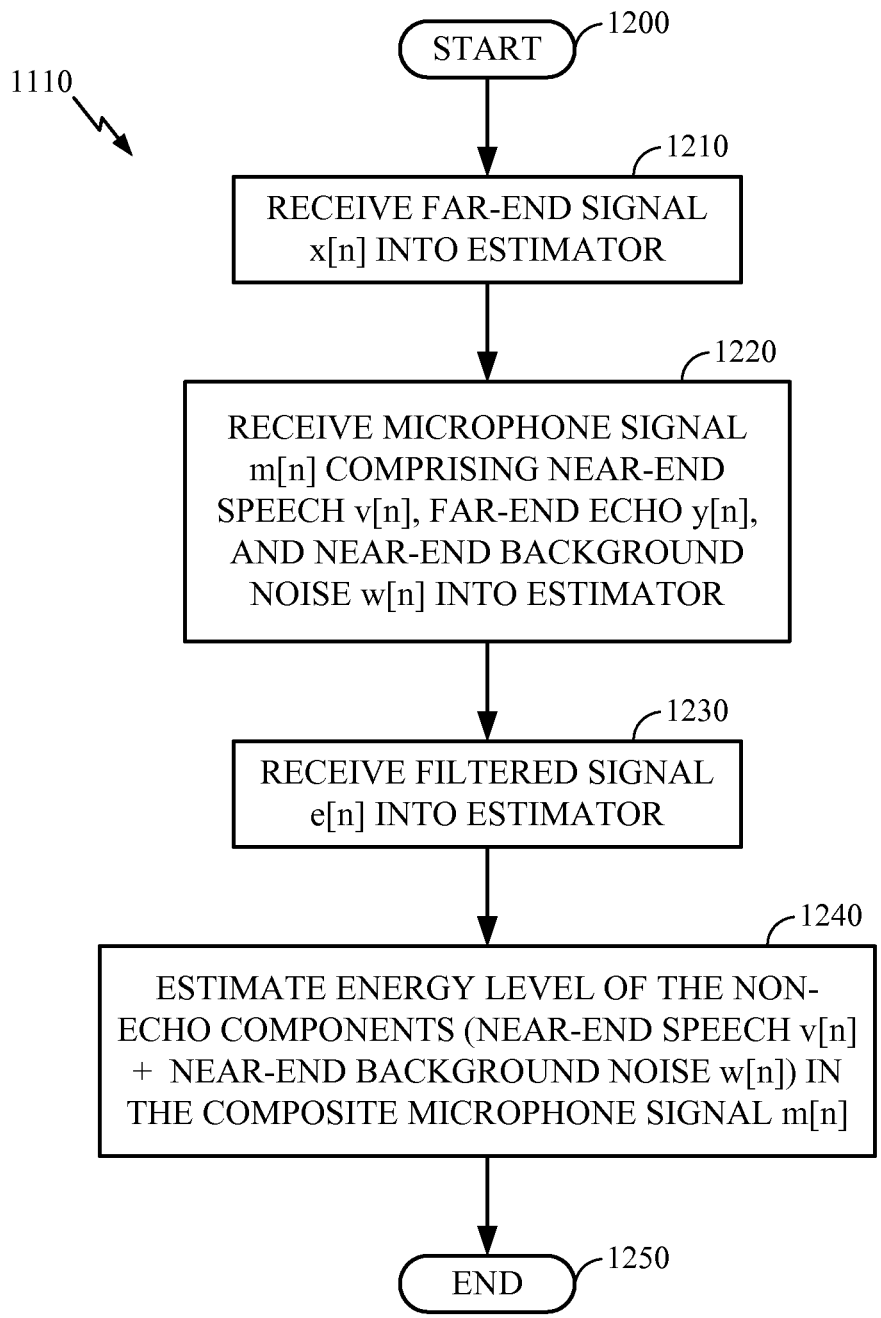
FIG. 12 is a flow diagram illustrating a process of estimating energy.

FIG. 12 is a flow diagram illustrating a process of estimating near end energy from step 1110 of FIG. 11. The process starts at step 1200. At step 1210, the energy estimator receives a far end signal. At step 1220, the energy estimator receives microphone signal m[n], which is a composite mixture of near end speech, far end echo and the near end background noise. At step 1230, the energy estimator receives filtered signal e[n]. At step 1240, the energy estimator estimates the energy level of the non-echo components outputted by the microphone (i.e., near end speech and the near end background noise). The process ends at step 1250.

Figure 13:
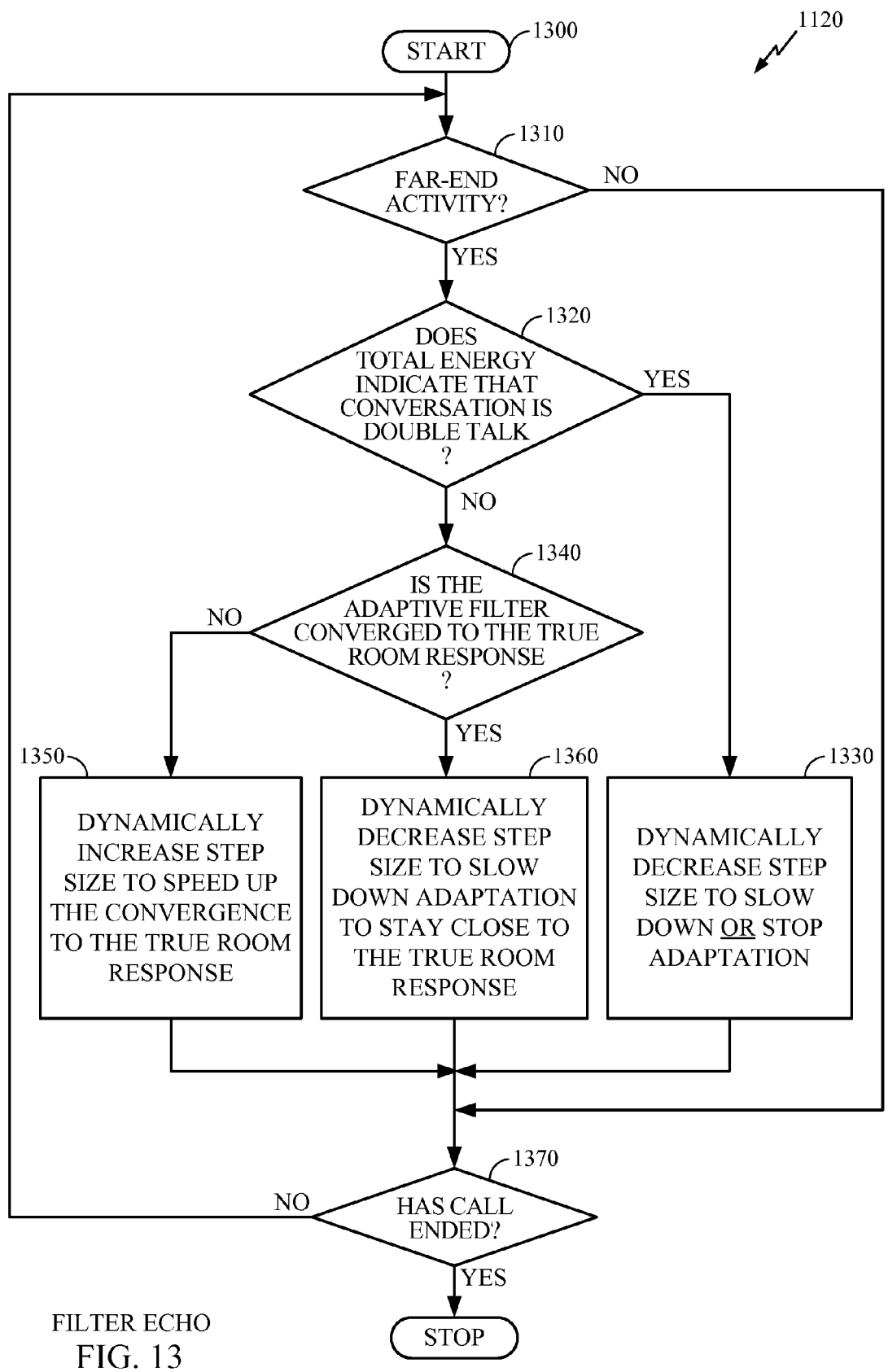
FIG. 13 is a flow diagram illustrating a process of filtering echo based on the estimated energy.

FIG. 13 is a flow diagram illustrating a process of filtering echo based on the near end estimated energy from step 1120 of FIG. 11. The process starts at step 1300. At decision step 1310, the process determines if there is far end activity (i.e. the process determines if there is far end excitation and hence if there is any echo to cancel). If yes, at decision step 1320, the process determines if the total near end energy indicates that conversation is in double talk. If yes, step 1330 dynamically decreases step size to slow down or stop the adaptive filter. At decision step 1370, the process determines if the call has ended. If not, the process returns to decision step 1310.

If step 1310 indicates there is far end activity, and if step 1320 outputs that the conversation is not in double talk, decision step 1340 determines whether the adaptive filter converged to the true solution (true room response), meaning the filter is accurate ($\Delta h \approx 0$). If yes, step 1360 dynamically decreases step size ($\mu_{NEW} \approx 0$) to slow down adaptation to stay close to the true solution, before determining if the call has ended at decision step 1370. If the output of step 1340 is no, meaning the adaptive filter has not converged to the true solution (Δh>0), the filter dynamically increases step size ($\mu_{NEW}$>0) to speed up convergence to the true room response, before determining if the call has ended at decision step 1370. If the call has ended, the process ends at step 1380.

The improved estimator is a key feature for filtering echo. An important improvement of this estimator is that it can estimate based on background noise and speech, not just one, like prior art estimators. As a result, the improved estimator more accurately estimates the whole near end signal.

Also, this improved estimator provides accurate and computationally efficient estimates of energies even during complicated situations such as double talk or echo path change events.

The improved filter uses a variable step size (VSS), normalized least mean square (NLMS) based method. As described herein, the variable step size filter can slow down or stop the filtering adaptation during double talk, when sounds are coming from both the communication devices simultaneously. As a result, these embodiments resolve the adaptation control problem of double talk without requiring a double talk detector.

It is appreciated by the above description that the described embodiments provide network echo suppression in mobile stations. According to one embodiment described above, detection and suppression of network echo is provided for a dual-mode mobile station in a wireless communication system. Although embodiments are described as applied to communications in a dual-mode AMPS and CDMA system, it will be readily apparent to a person of ordinary skill in the art how to apply the invention in similar situations where acoustic echo suppression is needed in a wireless communication system.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in a computer or electronic storage, in hardware, in a software module executed by a processor, or in a combination thereof. A software module may reside in a computer storage such as in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a mobile station. In the alternative, the processor and the storage medium may reside as discrete components in a mobile station.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A communication device comprising:
   an input configured to receive a signal comprising near end background noise, near end speech signals, and far end echo signals;
   an estimator module configured to estimate an energy level of the near end background noise and a level of the near end speech signals to determine whether the communication device is in a double talk mode; and
   an adaptive filter configured to reduce the far end echo signals using a variable step size algorithm, wherein:
   the variable step size algorithm dynamically changes a speed of the adaptive filter;
   the variable step size algorithm dynamically decreases the step size of the adaptive filter to a non-zero amount to slow down adaptation of the adaptive filter when the communication device is in the double talk mode; and
   upon a determination that the adaptive filter has converged to a true room response when the communication device is determined to not be in the double talk mode, the variable step size algorithm decreases the step size of the adaptive filter to slow down adaptation and stay close to the true room response.

2. The communication device of claim 1, wherein the speed of the adaptive filter is dynamically decreased by dynamically decreasing a step size or by dynamically increasing a regularization parameter.

3. The communication device of claim 1, wherein the variable step size algorithm dynamically decreases the speed of the adaptive filter when the communication device is in a double talk period.

4. The communication device of claim 1, wherein the variable step size algorithm dynamically increases the speed of the adaptive filter when at least one of following occurs: the signal contains only far end echo signals or the adaptive filter is away from the true room response.

5. The communication device of claim 1, wherein the variable step size algorithm dynamically changes a speed of the adaptive filter during echo path changes.

6. The communication device of claim 1, wherein the adaptive filter solves an adaptation control problem during single talk periods and solves the double talk problem during double talk periods.

7. The communication device of claim 1, wherein the adaptive filter reduces the far end echo signals without receiving inputs from a double talk detection algorithm external to the adaptive filter.

8. A communication device comprising:
an input configured to receive a signal comprising near end background noise, near end speech signals, and far end echo signals;
an estimator module configured to estimate an energy level of the near end background noise and a level of the near end speech signals to determine whether the communication device is in a double talk mode; and
an adaptive filter configured to reduce the far end echo signals using a variable step size algorithm, wherein the variable step size algorithm dynamically changes a speed of the adaptive filter, and
wherein the estimator module is configured to estimate an energy level of the near end background noise and a level of the near end speech signals using the equation:

$$\hat{\gamma}^2[n] = \hat{\sigma}_e^2[n] - \frac{1}{l\hat{\sigma}_x^2[n]}\hat{r}_{ex}^T[n]\hat{r}_{ex}[n],$$

where:
$\gamma^2[n]$ is an estimate of a near end signal energy estimator value,
$\hat{\sigma}_e^2[n]$ is an estimated variance of a residual error signal,
$\hat{\sigma}_x^2[n]$ is an estimated variance of an excitation signal vector,
$\hat{r}_{ex}[n]$ is an estimated cross-correlation between a far end signal vector and a residual error signal, and
$\hat{r}^T_{ex}$ is a transpose vector of $\hat{r}_{ex}[n]$.

9. A communication device comprising:
an input configured to receive a signal comprising near end background noise, near end speech signals, and far end echo signals;
an estimator module configured to estimate an energy level of the near end background noise and a level of the near end speech signals to determine whether the communication device is in a double talk mode; and
an adaptive filter configured to reduce the far end echo signals using a variable step size algorithm, wherein the variable step size algorithm dynamically changes a speed of the adaptive filter, and
wherein the adaptive filter is configured to reduce the far end echo signals using a variable step size algorithm to determine a variable step size using the equation:

$$\mu[n] = \frac{\mu_{NEW}[n]}{x^T[n]x[n]},$$

where:
$\mu[n]$ is a classical normalized least mean square solution for step size,
$\mu_{NEW}[n]$ is the variable step size,
x[n] is a far end signal vector, and
$x^T[n]$ is a transpose vector of x[n].

10. The communication device of claim 1, wherein the adaptive filter uses a least mean square (LMS) based methods or variants of LMS.

11. The communications device of claim 1, wherein the estimator module and the adaptive filter operate in the frequency domain or the time domain.

12. The communication device of claim 11, wherein the speed of the adaptive filter is dynamically decreased by dynamically decreasing a step size or by dynamically increasing a regularization parameter.

13. The communication device of claim 11, wherein the variable step size algorithm dynamically decreases the speed of the adaptive filter when at least one of following occurs: the communication device is in a double talk period or the adaptive filter is near the true room response.

14. The communication device of claim 11, wherein the variable step size algorithm dynamically increases the speed of the adaptive filter when at least one of following occurs: the signal contains only far end echo signals or the adaptive filter is away from the true room response.

15. The communication device of claim 11, wherein the variable step size algorithm dynamically changes a speed of the adaptive filter during echo path changes.

16. The communication device of claim 11, wherein the adaptive filter solves an adaptation control problem during single talk periods and solves the double talk problem during double talk periods.

17. The communication device of claim 11, wherein the adaptive filter filters the far end echo signals without receiving inputs from a double talk detection algorithm external to the adaptive filter.

18. A communication device comprising:
an input configured to receive a signal comprising near end background noise, near end speech signals, and far end echo signals;
an estimator module configured to estimate an energy level of the near end background noise and a level of the near end speech signals to determine whether the communication device is in a double talk mode; and
an adaptive filter configured to reduce the far end echo signals using a variable step size algorithm,
wherein:
the variable step size algorithm dynamically changes a speed of the adaptive filter;
the estimator module and the adaptive filter operate in the frequency domain or the time domain; and
the estimator module is configured to estimate an energy level of the near end background noise and a level of the near end speech signals using the equation:

$$\hat{\gamma}^2[n] = \hat{\sigma}_e^2[n] - \frac{1}{l\hat{\sigma}_x^2[n]}\hat{r}_{ex}^T[n]\hat{r}_{ex}[n],$$

where:
$\gamma^2[n]$ is an estimate of a near end signal energy estimator value,
$\hat{\sigma}_e^2[n]$ is an estimated variance of a residual error signal,
$\hat{\sigma}_x^2[n]$ is an estimated variance of an excitation signal vector,
$\hat{r}_{ex}[n]$ is an estimated cross-correlation between a far end signal vector and a residual error signal, and
$\hat{r}^T_{ex}[n]$ is a transpose vector of $\hat{r}_{ex}[n]$.

19. A communication device comprising:
an input configured to receive a signal comprising near end background noise, near end speech signals, and far end echo signals;
an estimator module configured to estimate an energy level of the near end background noise and a level of the near end speech signals to determine whether the communication device is in a double talk mode; and
an adaptive filter configured to reduce the far end echo signals using a variable step size algorithm, wherein the variable step size algorithm dynamically changes a speed of the adaptive filter,
wherein the estimator module and the adaptive filter operate in the frequency domain or the time domain, and wherein the adaptive filter is configured to reduce the far end echo signals using a variable step size algorithm to determine a variable step size using the equation:

$$\mu[n] = \frac{\mu_{NEW}[n]}{x^T[n]x[n]},$$

where:
$\mu[n]$ is a classical normalized least mean square solution for step size,
$\mu_{NEW}[n]$ is the variable step size,
x[n] is a far end signal vector, and
$x^T[n]$ is a transpose vector of x[n].

20. The communication device of claim 11, wherein the adaptive filter uses a least mean square (LMS) based methods or variants of LMS.

21. The communication device of claim 1, wherein the communication device comprises one of a cellular telephone or a bluetooth communication device.

22. The communication device of claim 1, wherein the input comprises at least one microphone.

23. A method of reducing echo signals during wireless communication, comprising:
receiving a voice signal comprising near end background noise, near end speech signals, and far end echo signals;
estimating an energy level comprising both the near end background noise and the near end speech signals;
determining whether said wireless communication is in a double talk period based on the estimated energy level; and
reducing said echo signals using a variable step size adaptive filter, wherein reducing said echo signals comprises decreasing the step size of the adaptive filter upon a determination that the adaptive filter has converged to a true room response when the wireless communication is determined to not be in the double talk period, wherein decreasing step size slows down adaptation of the adaptive filter and allows the adaptive filter to stay close to the true room response, and wherein reducing said echo signals also includes dynamically decreasing the step size of the adaptive filter to a non-zero amount to slow down, without initially stopping, adaptation of the adaptive filter when the communication device is in the double talk period.

24. The method of claim 23, wherein reducing said echo signals further comprises dynamically reducing the speed of the adaptive filter when there is double talk.

25. The method of claim 23, wherein reducing said echo signals further comprises dynamically decreasing a step size or dynamically increasing a regularization parameter when there is double talk.

26. The method of claim 23, further comprising increasing the speed of the adaptive filter when at least one of following occurs: said wireless communication is not in a double talk period or the adaptive filter estimate is away from the true room response.

27. The method of claim 23, wherein reducing said echo signals comprises filtering the echo signals without inputs from a double talk detection algorithm external to the adaptive filter.

28. An echo cancellation module comprising:
an estimator module configured to estimate the energy of a near end sound signal; and
an adaptive filter configured to:
determine when said sound signal is in a double talk period;
reduce a far end echo in response to said signal being in a double talk period, wherein the adaptive filter adjusts a variable step size based on the estimated energy;
dynamically decreases the step size of the adaptive filter to a non-zero amount to slow down adaptation of the adaptive filter when the communication device is in the double talk period; and
decrease the step size upon a determination that the adaptive filter has converged to a true room response when the sound signal is determined to not be in the double talk period, wherein decreasing the step size slows down adaptive filter adaptation and allows the adaptive filter to stay close to the true room response.

29. The echo cancellation module of claim 28, wherein the adjustment of the adaptive filter comprises dynamically reducing the variable step size to decrease a speed of the adaptive filter.

30. The echo cancellation module of claim 29, wherein the variable step size is dynamically reduced during double talk.

31. The echo cancellation module of claim 28, wherein the adjustment of the adaptive filter comprises dynamically increasing the variable step size to increase a speed of the adaptive filter.

32. The echo cancellation module of claim 28, wherein the adaptive filter provides filtering without receiving inputs from a double talk detection algorithm external to the filter.

33. A wireless communication device, comprising:
means for receiving a voice signal comprising near end background noise, near end speech signals, and far end echo signals;
means for estimating an energy level comprising both the near end background noise and the near end speech signals;
means for determining whether said wireless communication is in a double talk period based on the estimated energy level;
means for reducing said echo signals using a variable step size adaptive filter;
means for dynamically decreasing the step size of the variable step size adaptive filter to a non-zero amount to slow down adaptation of the variable step size adaptive filter when the communication device is in the double talk period; and
means for decreasing the step size of the adaptive filter upon a determination that the adaptive filter has converged to a true room response when said wireless communication is determined to not be in the double talk period, wherein decreasing the step size slows down the adaptive filter adaptation and allows the adaptive filter to stay close to the true room response.

34. The wireless communication device of claim 33, wherein the means for reducing comprises means for dynamically decreasing a speed by dynamically decreasing a step size or by dynamically increasing a regularization parameter.

35. The wireless communication device of claim 33, wherein the means for reducing solves an adaptation control problem during single talk periods and solves a double talk problem during double talk periods.

36. A non-transitory computer-readable storage medium comprising instructions that, when executed by a computer, cause the computer to perform the method of:

receiving a voice signal comprising near end background noise, near end speech signals, and far end echo signals;

estimating an energy level comprising both the near end background noise and the near end speech signals;

determining whether said wireless communication is in a double talk period based on the estimated energy level; and reducing said echo signals using a variable step size adaptive filter, wherein reducing said echo signals comprises:

dynamically decreasing the step size of the adaptive filter to a non-zero amount to slow down adaptation of the adaptive filter when the communication device is in the double talk period;

decreasing the step size of the adaptive filter upon a determination that the adaptive filter has converged to a true room response when the wireless communication is determined to not be in a double talk period, wherein reducing step size slows down adaptation of the adaptive filter and allows the adaptive filter to stay close to the true room response.

37. The non-transitory computer-readable storage medium of claim 36, further comprising instructions for dynamically increasing a speed of the variable step size adaptive filter:

during single talk periods; or when the adaptive filter is away from the true room response.

38. The non-transitory computer-readable storage medium of claim 36, wherein the adaptive filter does not receive inputs from a double talk detection algorithm external to the adaptive filter.

\* \* \* \* \*